(12) United States Patent
Vivar et al.

(10) Patent No.: US 11,817,969 B2
(45) Date of Patent: *Nov. 14, 2023

(54) SYSTEMS, DEVICES AND METHODS FOR AUTOMATICALLY ADDRESSING SERIALLY CONNECTED SLAVE DEVICES

(71) Applicant: Astec International Limited, Kowloon (HK)

(72) Inventors: Vincent Vicente Vivar, Muntinlupa (PH); James Larin David, Kowloon (HK); Francis Xiaver Sicat De Rama, Bagumbayan (PH)

(73) Assignee: Astec International Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,240

(22) Filed: Apr. 22, 2022

(65) Prior Publication Data
US 2022/0263684 A1    Aug. 18, 2022

Related U.S. Application Data

(63) Continuation of application No. 16/942,260, filed on Jul. 29, 2020, now Pat. No. 11,316,711.

(51) Int. Cl.
*H04L 12/40* (2006.01)
*G06F 13/42* (2006.01)

(52) U.S. Cl.
CPC .... *H04L 12/40169* (2013.01); *G06F 13/4247* (2013.01); *H04L 12/40019* (2013.01); *H04L 2012/40215* (2013.01)

(58) Field of Classification Search
CPC ............... H04L 61/2038; G06F 13/385; G06F 2213/0052
See application file for complete search history.

(56) References Cited

U.S. PATENT DOCUMENTS

| 5,204,669 A | 4/1993 | Dorfe et al. |
| 8,122,159 B2 | 2/2012 | Monreal |

(Continued)

FOREIGN PATENT DOCUMENTS

| CN | 109889627 A | 6/2019 |
| JP | 2014241477 A | 12/2014 |

(Continued)

OTHER PUBLICATIONS

English translation of JP2014241477; Dec. 25, 2014; 10 pages (Year: 2014).*

(Continued)

*Primary Examiner* — Brian T Misiura (57) ABSTRACT

A system for automatically addressing serially connected slave devices includes a master device and multiple slave devices each including a serial communication transceiver, an address input port, an address output port, and a controller. The system also includes a serial communication wiring bus connected between the serial communication transceivers of the master and slave devices, and at least one digital address line connected between the address input ports and the address output ports. Each controller is configured to receive a PWM or PFM signal from a previous one of the multiple slave devices, determine an address for the slave device including the controller according to the received PWM or PFM signal, and transmit a PWM or PFM signal indicative of the determined address to a subsequent one of the multiple slave devices.

16 Claims, 3 Drawing Sheets

(56) References Cited

U.S. PATENT DOCUMENTS

| | | |
|---|---|---|
| 8,205,017 B2 | 6/2012 | Parr et al. |
| 8,631,179 B1 | 1/2014 | Faulds et al. |
| 8,645,580 B2 | 2/2014 | Koudar |
| 8,935,450 B2 | 1/2015 | Nierop et al. |
| 8,977,907 B2 * | 3/2015 | Ghazanfari ......... G06F 11/3668 714/38.1 |
| 10,075,284 B1 | 9/2018 | Rodrigues et al. |
| 10,638,561 B2 | 4/2020 | Neri et al. |
| 10,795,845 B1 | 10/2020 | Vemuri et al. |
| 2007/0253342 A1 * | 11/2007 | Bierdeman ......... H04L 12/2807 370/254 |
| 2009/0182920 A1 | 7/2009 | Chao |
| 2010/0185784 A1 | 7/2010 | De et al. |
| 2011/0116559 A1 | 5/2011 | Battista |
| 2013/0057339 A1 | 3/2013 | Koudar |
| 2013/0138845 A1 | 5/2013 | Hill |
| 2014/0223048 A1 | 8/2014 | Troeger |
| 2015/0370312 A1 | 12/2015 | Desposito et al. |
| 2016/0205066 A1 | 7/2016 | Attaewala et al. |
| 2017/0359195 A1 | 12/2017 | Bender et al. |
| 2018/0013578 A1 | 1/2018 | Gozloo et al. |
| 2019/0098723 A1 | 3/2019 | Sadwick et al. |

FOREIGN PATENT DOCUMENTS

| | | |
|---|---|---|
| TW | 200947958 A | 11/2009 |
| WO | 2011012041 A1 | 2/2011 |

OTHER PUBLICATIONS

Taiwan Office Action and Search Report and English translation for TW Application No. 110127889, dated May 19, 2022; 15 pages.

Extended European Search Report for EP Application 21187234.6, dated Dec. 21, 2021; 8 pages.

Local Interconnect Network; "LIN Extra Wire Daisy Chain Slave Node Position Detection Revision 1.0;" 16 pages; Dec. 10, 2008.

Japan Office Action for Japan Application No. 2021-121323, dated Sep. 27, 2022; 4 pages (with translation).

Philippines Office Action for PH Application No. 1-2021-050333, dated Dec. 21, 2022; 4 pages.

* cited by examiner

SYSTEMS, DEVICES AND METHODS FOR AUTOMATICALLY ADDRESSING SERIALLY CONNECTED SLAVE DEVICES

CROSS-REFERENCE TO RELATED APPLICATIONS

This application claims the benefit and priority of U.S. application Ser. No. 16/942,260, filed Jul. 29, 2020. The entire disclosure of the above application is incorporated herein by reference.

TECHNICAL FIELD

The present disclosure relates to systems, devices and methods for automatically addressing serially connected slave devices.

BACKGROUND

This section provides background information related to the present disclosure which is not necessarily prior art.

Figure 1:
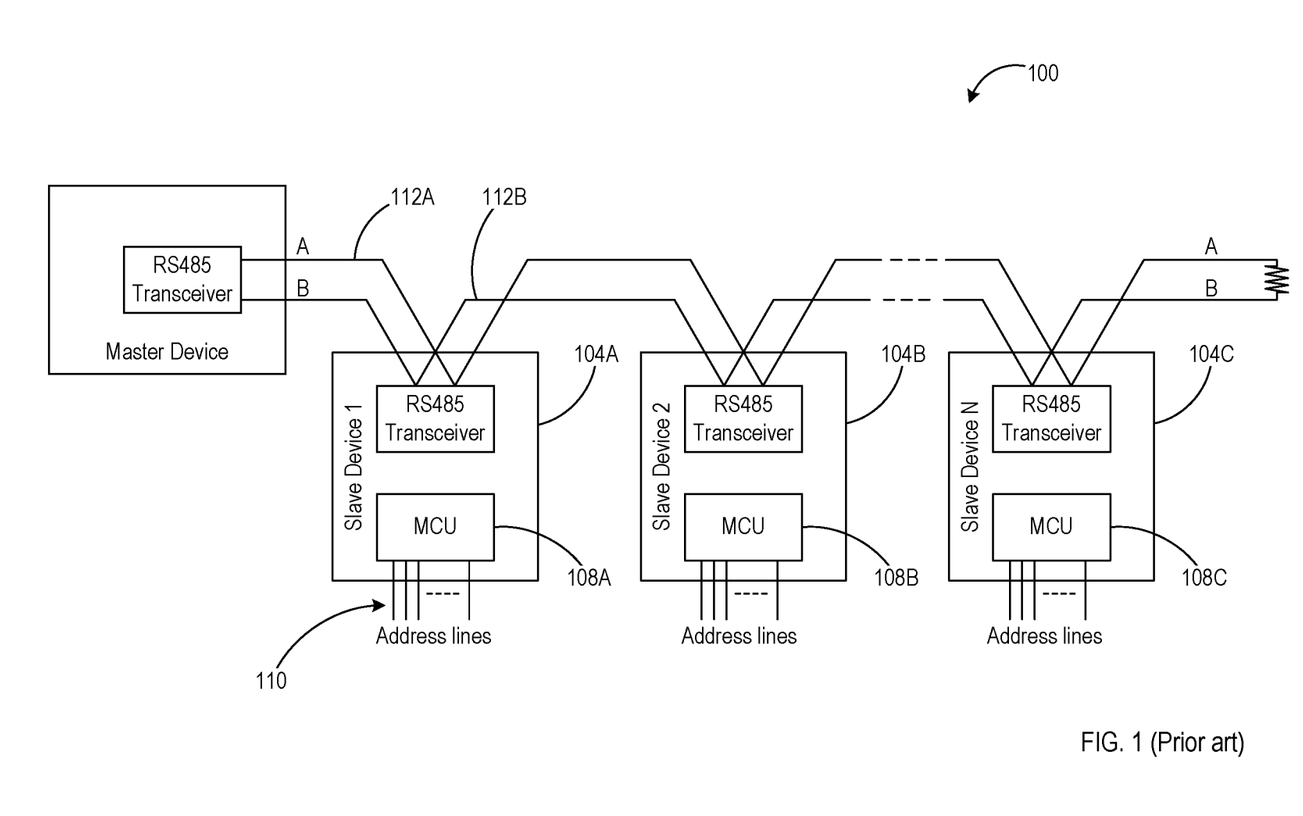
FIG. 1 is a block diagram of system including a master device and multiple serially connected slave devices, according to the prior art.

Traditionally, the address of an RS-485 slave device is determined by hardwired address lines. The address lines are connected to a controller of the RS-485 slave device that decodes addressing signals from the hardwired address lines to determine its assigned address. An example system 100 is illustrated in FIG. 1, where each slave device 104A, 104B and 104C receives addressing signals from an external device via four or more hardwired address lines 110.

In this approach, increasing the number of slave devices requires more and more hardwired address lines. This makes the wiring complicated and costly, especially if the devices are located far apart from one another. In some cases, DIP switches that are external to the slave device enclosure are used to manually designate the state of each address line, which also adds to the cost of the device.

External devices may be used to initiate an automatic addressing process, by disconnecting the RS-485 bus 112A and 112B to transmit address data to the slave devices 104A, 104B, and 104C. The use of handshaking between devices, in addition to disconnecting the RS-485 bus 112A and 112B, makes this approach complex and costly.

Different resistances may be connected between the slave devices 104A, 104B and 104C to designate different addresses. However, this approach requires analog-to-digital converters in the controllers 108A, 108B and 108C, which makes the implementation costly and inflexible.

SUMMARY

This section provides a general summary of the disclosure, and is not a comprehensive disclosure of its full scope or all of its features.

According to one aspect of the present disclosure, a system for automatically addressing serially connected slave devices includes a master device including a serial communication transceiver, and multiple slave devices each including a serial communication transceiver, an address input port, an address output port, and a controller. The controller is in communication with the serial communication transceiver, the address input port and the address output port. The system also includes a serial communication wiring bus connected between the serial communication transceiver of the master device with the serial communication transceivers of the multiple slave devices, and at least one digital address line connected between the address input ports and the address output ports of the multiple slave devices in a daisy chain arrangement. Each controller is configured to receive a pulse-width modulation (PWM) or pulse-frequency modulation (PFM) signal from a previous one of the multiple slave devices in the daisy chain arrangement via the address input port, determine an address for the slave device comprising said controller according to the received PWM or PFM signal, and transmit a PWM or PFM signal to a subsequent one of the multiple slave devices in the daisy chain arrangement via the address output port. The transmitted PWM or PFM signal is indicative of the determined address and different than the received PWM or PFM signal.

According to another aspect of the present disclosure, a device comprises an RS-485 transceiver for receiving commands from a master device via an RS-485 wiring bus, an address input port for coupling to a first digital address line, an address output port for coupling to a second digital address line, and a controller in communication with the RS-485 transceiver, the address input port and the address output port. The controller is configured to receive a pulse-width modulation (PWM) or pulse-frequency modulation (PFM) signal from a first other slave device via the address input port, determine an address for the slave device comprising said controller according to the received PWM or PFM signal, and transmit a PWM or PFM signal to a second other slave device via the address output port. The transmitted PWM or PFM signal is indicative of the determined address and different than the received PWM or PFM signal.

According to another aspect of the present disclosure, a method of automatically addressing serially connected devices in a system is disclosed. The system includes a master device including a serial communication transceiver, multiple slave devices each including a serial communication transceiver, an address input port, an address output port, and a controller, a serial communication wiring bus connected between the serial communication transceiver of the master device with the serial communication transceivers of the multiple slave devices, and at least one digital address line connected between the address input ports and the address output ports of the multiple slave devices in a daisy chain arrangement. The method includes receiving, by a controller of one of the multiple slave devices, a pulse-width modulation (PWM) or pulse-frequency modulation (PFM) signal from a previous one of the multiple slave devices in the daisy chain arrangement via the address input port, determining an address for the slave device comprising said controller according to the received PWM or PFM signal, and transmitting a PWM or PFM signal to a subsequent one of the multiple slave devices in the daisy chain arrangement via the address output port. The transmitted PWM or PFM signal is indicative of the determined address and different than the received PWM or PFM signal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
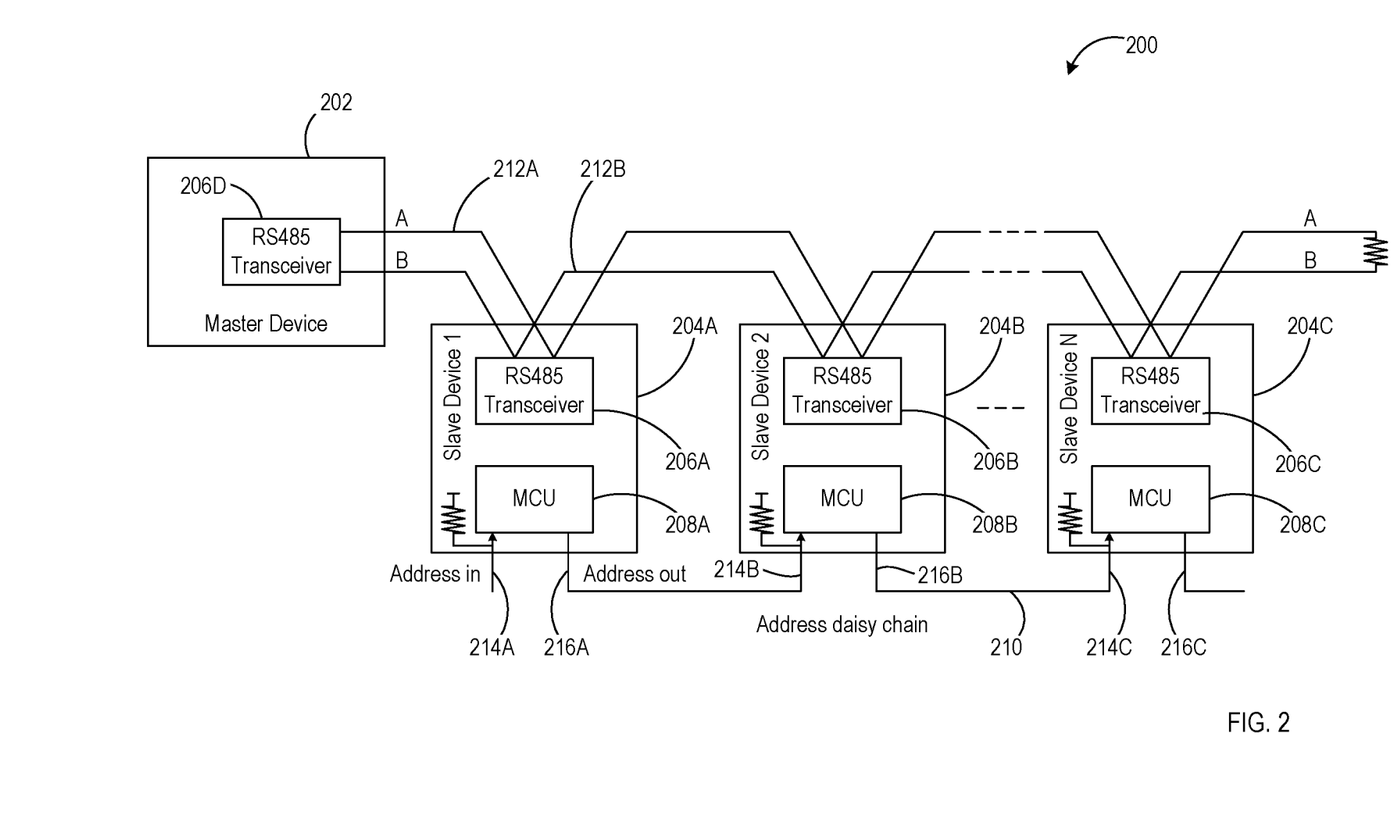
FIG. 2 is a block diagram of a system for automatically assigning addresses to multiple serially connected slave devices, according to one example embodiment of the present disclosure.

A system for automatically addressing serially connected slave devices according to one example embodiment of the present disclosure is illustrated in FIG. 2, and indicated generally by reference number 200. The system 200 includes a master device 202 including a serial communication transceiver 206D, and multiple slave devices 204A, 204B and 204C.

The slave device 204A includes a serial communication transceiver 206A, an address input port 214A, an address output port 216A, and a controller 208A. The controller 208A is in communication with the serial communication transceiver 206A, the address input port 214A and the address output port 216A.

Similarly, the slave device 204B includes a serial communication transceiver 206B, an address input port 214B, an address output port 216B, and a controller 208B. The slave device 204C includes a serial communication transceiver 206C, an address input port 214C, an address output port 216C, and a controller 208C.

The system 200 also includes a serial communication wiring bus (e.g., lines 212A and 212B), connected between the serial communication transceiver 206D of the master device 202 and the serial communication transceivers 206A, 206B and 206C of the multiple slave devices 204A, 204B and 204C. At least one digital address line 210 is connected between the address input ports 214A, 214B and 214C and the address output ports 216A, 216B and 216C of the slave devices 204A, 204B and 204C, in a daisy chain arrangement.

Each controller 208A, 208B and 208C may be configured to receive a pulse-width modulation (PWM) or pulse-frequency modulation (PFM) signal from a previous one of the multiple slave devices in the daisy chain arrangement via the address input port, determine an address for the slave device comprising said controller according to the received PWM or PFM signal, and transmit a PWM or PFM signal to a subsequent one of the multiple slave devices in the daisy chain arrangement via the address output port. The transmitted PWM or PFM signal is indicative of the determined address and different than the received PWM or PFM signal.

For example, the slave device 204A may be the first controller in the daisy chain arrangement, and the controller 208A of the slave device 204A may detect a direct current signal at a pull-up voltage level during startup of the system 200 (e.g., because the address input port 214A of the slave device 204A is connected to a pull-up voltage reference via a resistor, and the address input port 214A does not receive a PWM or PFM signal due to the slave device 204A being the first device in the daisy chain arrangement).

The controller 208A may determine an address for the first slave device 204A by claiming a first address (e.g., 0x01) in response to detecting the direct current signal during startup. The controller 208A may then determine a predefined PWM or PFM signal corresponding to the claimed first address for sending to the slave device 204B (e.g., the second or subsequent slave device in the daisy chain arrangement) via the address output port 216A.

For example, each slave device 204A, 204B and 204C may store a lookup table, computational formula, etc., that links addresses to PWM or PFM signals. An example of mapping PWM or PFM signals to addresses is listed below in Table 1.

TABLE 1

| PWM signal transmitted via the address output port | PFM signal transmitted via the address output port | Claimed Address |
|---|---|---|
| 5% | 400 Hz | 0x01 |
| 10% | 390 Hz | 0x02 |
| 15% | 380 Hz | 0x03 |
| 20% | 370 Hz | 0x04 |
| . . . | . . . | . . . |

In the above example, the first controller 208A may receive a 100% duty cycle signal or a zero Hz signal (i.e., the direct current signal of the pull-up voltage reference). The first controller then selects the first address 0x01 in the lookup table, and outputs a PWM signal of 5% or a PFM signal of 400 Hz at the address output port 216A.

The controller 208B of the slave device 204B receives the PWM or PFM signal from the slave device 204A, via the address input port 214B. The controller 208B identifies the first address that was claimed by the first slave device 204A according to the PWM or PFM signal (e.g., because the PWM or PFM signal corresponds to the first address claimed by the first slave device 204A, etc.).

After identifying the first address claimed by the first slave device 204A based on the PWM or PFM signal, the controller 208B may then claim a second address (e.g., a subsequent address in a predefined sequence stored in memory, such as 0x02, etc.) for the second slave device 204B. Similar to above, the controller 208B may then determine a predefined PWM or PFM signal corresponding to the claimed second address for sending to the slave device 204C (e.g., the third or subsequent slave device in the daisy chain arrangement) via the address output port 216B.

In the above example, the controller 208B receives a PWM signal of 5% or a PFM signal of 400 Hz from the slave device 204A, determines that the slave device 204A claimed the address 0x01, and selects the next address 0x02 for the slave device 204B. The controller 208B then outputs a PWM signal of 10% or a PFM signal of 390 Hz to indicate that it has claimed the address 0x02.

The controller 208C may then identify the previously claimed address based on the PWM or PFM signal received at the address input port 214C, claim a third address for the third slave device 204C, and transmit a new PWM or PFM signal corresponding to the claimed third address via the address output port 216C. This process may be repeated for each slave device in system, until all slave devices have automatically and autonomously claimed unique addresses.

The address line 210 connects the slave devices 204A, 204B and 204C together in a daisy chain arrangement. The daisy chain arrangement may include any suitable wiring connection of the slave devices 204A, 204B and 204C together in sequence, in a ring, etc. The address line 210 may include any suitable electrical bus, wire(s), etc., for sending digital signals, including PWM and/or PFM signals, between the devices 204A, 204B and 204C. In some embodiments, the address line 210 may be a two-wire connection (e.g., with a ground wire and a signal wire, etc.).

The address input ports 214A, 214B and 214C, and the address output ports 216A, 216B and 216C, may include any suitable connectors, terminals, pads, etc. for receiving and transmitting signals to and from the slave devices 204A, 204B and 204C.

Although FIG. 2 illustrates three slave devices 204A, 204B and 204C connected in a daisy chain arrangement, other embodiments may include more or less slave devices, the slave devices may be connected together in arrangements other than a daisy chain, etc.

FIG. 2 illustrates the serial communication transceivers 206A, 206B, 206C and 206D as RS-485 transceivers. In other embodiments, the system 200 may include any suitable serial communication transceivers, any suitable serial communication wiring bus (lines 212A and 212B) and protocol, any suitable serial communication devices, etc. For example, the system 200 may use RS-422 devices and communication interfaces, controller area network (CAN) devices and communication interfaces, etc.

The serial communication connection between the master device 202 and the slave devices 204A, 204B and 204C includes two lines 212A and 212B, which may include any suitable electrical bus (e.g., a linear bus topology), wire(s), etc. For example, differential signaling may be used for communication over a twisted pair of two wires, etc.

When the master device 202 sends an instruction to the slave devices 204A, 204B and 204C over the lines 212A and 212B, each slave device 204A, 204B and 204C may compare an address in the instruction received from the master device 202 to their own address in order to determine if the instruction is intended for the slave device (e.g., when the addresses match, etc.).

In some embodiments, the master device 202 may transmit a save command to at least one of the slave devices 204A, 204B and 204C, via the serial communication wiring bus 212A and 212B. The save command may be used to lock the address claimed by the slave device, etc. For example, in response to receiving the save command, a slave device may lock its claimed address and not change the claimed address even if other slave devices change their own addresses (e.g., the locked slave device will not update its address even if the PWM or PFM signal that the locked slave device receives changes).

The master device 202 may transmit a release command to at least one of the slave devices 204A, 204B and 204C, via the serial communication wiring bus 212A and 212B. The release command may be used to reset the address claimed by the slave device, etc. For example, in response to receiving the release command, a slave device may reset its claimed address and then obtain a new address automatically based on the PWM or PFM signal received by the slave device.

The save and release commands may not affect the autonomous resolution process, but may augment the process to avoid dynamic changes in the addresses if one or more devices in the daisy chain is powered off (e.g., if one slave device turns off, the other devices may not change their addresses).

The system 200 may allow for automatic addressing of each slave device 204A, 204B and 204C, using the at least one address line 210 and PWM or PFM signals. Each slave device 204A, 204B and 204C may receive a PWM or PFM signal from a previous slave device and identify an address used by the previous slave device based on the signal (or claim a first address when a pull-up voltage is detected with no PWM or PFM signal, etc.). Therefore, each slave device 204A, 204B and 204C can be assigned a unique address automatically.

The system 200 may not require any handshakes between the slave devices 204A, 204B and 204C, or the master device 202, in order to assign the unique addresses, and may not require disconnecting the serial communication bus 212A and 212B to transmit addresses to the slave devices 204A, 204B and 204C. The slave devices 204A, 204B and 204C may not require any dip switches or other external interface for manually setting addresses of the slave devices 204A, 204B and 204C.

In some embodiments, the address line(s) 210 may include only one or two wires for transmitting the PWM and PFM signals to assign the addresses, as opposed to more complicated wiring schemes that require four, eight, or more wires to assign addresses from an external device that initiates the address resolution process. In the system 200, each slave device 204A, 204B and 204C may determine its own address upon startup, etc., according to the PWM and PFM signals transmitted between the slave devices 204A, 204B and 204C.

Therefore, the system 200 may not include any external device for initiating the address resolution process, may not include any external trigger, etc. Removing the eternal device for address resolution, and reducing the number of wires needed for the address line 210, may reduce cost and complexity of the system, may reduce the time and space needed to run the address line 210 between the slave devices 204A, 204B and 204C, may reduce errors and bugs, etc.

This automatic addressing may be very useful for field installations to avoid complexity of cabling or maintenance/management of configurations in assigning unique combination of address lines for each device in the RS-485 bus. Field installations may require minimal setup processes to avoid human error, and increase productivity of technicians setting up systems with RS-485 communication interfaces. These advantages may become even more important as the number of slave devices in the system increases.

The system 200 may be used in any suitable applications that use serial connections (e.g., RS-485, RS-422, CAN, etc.) between master and slave devices. For example, in horticulture lighting applications, customers and installers may add power supply units to drive light emitting diodes without worrying about adding cables or reconfiguring device addresses.

In telecom applications, field installations (e.g., rooftops, towers, etc.), may have varying configurations in terms of the different types of modules in the system and the number of devices for each model type. The system 200 may increase productivity of installers, avoid human error, reduce cost associated with device addressing, etc.

In hyperscale applications, power shelves may use adapted Modbus through RS-485 as a standard communication interface. The system 200 may assist in maintaining and managing device address configurations at the system level.

The controllers 208A, 208B and 208C may include any suitable microprocessor, microcontroller, integrated circuit, digital signal processor, etc., which may include memory. The controllers 208A, 208B and 208C may be configured to perform (e.g., operable to perform, etc.) any of the example processes described herein using any suitable hardware and/or software implementation. For example, the controllers 208A, 208B and 208C may execute computer-executable instructions stored in a memory, may include one or more logic gates, control circuitry, etc., as described above.

According to another aspect of the present disclosure, a device comprises an RS-485 transceiver for receiving commands from a master device via an RS-485 wiring bus, an address input port for coupling to a first digital address line, an address output port for coupling to a second digital address line, and a controller in communication with the RS-485 transceiver, the address input port and the address output port.

The controller is configured to receive a pulse-width modulation (PWM) or pulse-frequency modulation (PFM) signal from a first other slave device via the address input port, determine an address for the slave device comprising said controller according to the received PWM or PFM signal, and transmit a PWM or PFM signal to a second other slave device via the address output port. The transmitted PWM or PFM signal is indicative of the determined address and different than the received PWM or PFM signal.

In some embodiments, the controller may be configured to determine the address for the slave device by identifying an address claimed by the first other slave device according to the predefined PWM or PFM signal received from the first other slave device that corresponds to the address claimed by the first other slave device, and claiming a subsequent address in response to identifying the address claimed by the first other slave device.

The controller may be configured to determine a predefined PWM or PFM signal corresponding to the claimed subsequent address for sending to the second other one of the multiple slave devices in the daisy chain arrangement.

In some embodiments, the controller may be configured to receive a save command from the master device via the RS-485 wiring bus, and lock the determined address in response to receiving the save command from the master device. The controller may be configured to receive a release command from the master device via the RS-485 wiring bus, and reset the determined address in response to receiving the release command from the master device.

Figure 3:
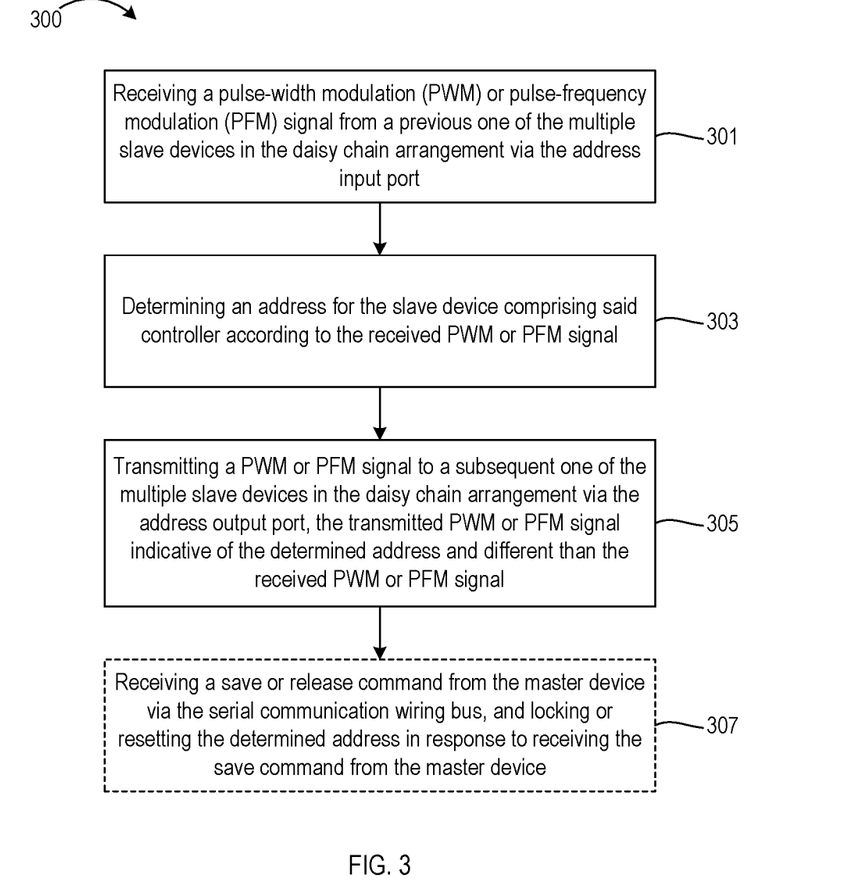
FIG. 3 is a flowchart of an example method for automatically assigning addresses to multiple serially connected slave devices, according to another example embodiment of the present disclosure.

FIG. 3 illustrates a method 300 for automatically addressing serially connected devices in a system, according to another example embodiment. The system includes a master device including a serial communication transceiver, multiple slave devices each including a serial communication transceiver, an address input port, an address output port, and a controller, a serial communication wiring bus connected between the serial communication transceiver of the master device with the serial communication transceivers of the multiple slave devices, and at least one digital address line connected between the address input ports and the address output ports of the multiple slave devices in a daisy chain arrangement.

The method 300 includes, at 301, receiving (e.g., by a controller of one of the multiple slave devices) a pulse-width modulation (PWM) or pulse-frequency modulation (PFM) signal from a previous one of the multiple slave devices in the daisy chain arrangement via the address input port.

At 303, the method 300 includes determining an address for the slave device comprising said controller according to the received PWM or PFM signal. At 305, the method 300 includes transmitting a PWM or PFM signal to a subsequent one of the multiple slave devices in the daisy chain arrangement via the address output port. The transmitted PWM or PFM signal is indicative of the determined address and different than the received PWM or PFM signal.

The method 300 may optionally include, at 307, receiving a save command from the master device via the serial communication wiring bus, and locking the determined address in response to receiving the save command from the master device, or receiving a release command from the master device via the RS-485 wiring bus, and resetting the determined address in response to receiving the release command from the master device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system for automatically addressing serially connected slave devices, the system comprising:
 multiple slave devices coupled together in a daisy chain arrangement, each slave device comprising:
  a controller; and
  a serial communication transceiver; and
 a serial communication wiring bus connected between the serial communication transceivers of the multiple slave devices;
 wherein each controller is configured to:
  receive a pulse-width modulation (PWM) or pulse-frequency modulation (PFM) signal from a previous one of the multiple slave devices in the daisy chain arrangement;
  determine an address for the slave device comprising the controller according to the received PWM or PFM signal; and
  transmit a PWM or PFM signal to a subsequent one of the multiple slave devices in the daisy chain arrangement, the transmitted PWM or PFM signal indicative of the determined address and different than the received PWM or PFM signal; and
 wherein at least one of the slave devices is configured to receive a save command via the serial communication wiring bus to lock the address determined by the at least one slave device.

2. The system of claim 1, wherein the controller of a first one of the multiple slave devices in the daisy chain arrangement is configured to:
 detect a direct current signal at a pull-up voltage level during startup; and
 determine the address for the first slave device by claiming a first address in response to detecting the direct current signal during startup.

3. The system of claim 2, wherein the controller is configured to determine a predefined PWM or PFM signal corresponding to the claimed first address for sending to a second one of the multiple slave devices in the daisy chain arrangement.

4. The system of claim 3, wherein the controller of the second slave device is configured to determine the address for the second slave device by:
 identifying the first address claimed by the first slave device according to the predefined PWM or PFM signal received from the first slave device that corresponds to the first address; and
 claiming a second address in response to identifying the first address claimed by the first slave device.

5. The system of claim 4, wherein the controller of the second slave device is configured to determine a predefined PWM or PFM signal corresponding to the claimed second address for sending to a third one of the multiple slave devices in the daisy chain arrangement.

6. The system of claim 1, wherein each controller is configured to determine the address for the slave device comprising the controller by:
 identifying an address claimed by the previous slave device according to the PWM or PFM signal received from the previous slave device that corresponds to the address claimed by the previous slave device; and
 claiming a subsequent address in response to identifying the address claimed by the previous slave device.

7. The system of claim 6, wherein the controller is configured to determine a predefined PWM or PFM signal corresponding to the claimed subsequent address for sending to a subsequent one of the multiple slave devices in the daisy chain arrangement.

8. The system of claim 1, wherein each controller is configured to automatically determine the address for the slave device comprising the controller without an external device initiating an address resolution process.

9. The system of claim 1, wherein each controller is configured to automatically determine the address for the slave device comprising the controller without a handshake process with any other slave devices through the serial communication wiring bus.

10. The system of claim 1, wherein at least one of the slave devices is configured to receive a release command via the serial communication wiring bus to reset the address determined by the at least one slave device.

11. The system of claim 1, wherein each serial communication transceiver comprises an RS-485 transceiver, an RS-422 transceiver or a controller area network (CAN) transceiver.

12. The system of claim 1, wherein the system does not include more than two address lines connected between the multiple slave devices.

13. The system of claim 1, wherein each slave device lacks any dip switches for setting an address of the slave device.

14. A slave device comprising:
 an RS-485 transceiver for receiving commands via an RS-485 wiring bus;
 a controller in communication with the RS-485 transceiver and configured to:
  receive a pulse-width modulation (PWM) or pulse-frequency modulation (PFM) signal from a first other slave device;
  determine an address for the slave device according to the received PWM or PFM signal from the first other slave device; and
  transmit a PWM or PFM signal to a second other slave device, the transmitted PWM or PFM signal indicative of the determined address and different than the received PWM or PFM signal;
 wherein the controller is configured to determine the address for the slave device by:
  identifying an address claimed by the first other slave device according to the PWM or PFM signal received from the first other slave device that corresponds to the address claimed by the first other slave device; and
  claiming a subsequent address in response to identifying the address claimed by the first other slave device; and
 wherein the controller is configured to:
  receive a save command via the RS-485 wiring bus; and
  lock the determined address in response to receiving the save command.

15. The slave device of claim 14, wherein the controller is configured to determine a predefined PWM or PFM signal corresponding to the claimed subsequent address for sending to the second other slave device.

16. The slave device of claim 14, wherein the controller is configured to:
- receive a release command via the RS-485 wiring bus; and
- reset the determined address in response to receiving the release command.

* * * * *